(12) United States Patent
Cho et al.

(10) Patent No.: US 8,705,152 B2
(45) Date of Patent: Apr. 22, 2014

(54) SYSTEM, MEDIUM, AND METHOD CALIBRATING GRAY DATA

(75) Inventors: Min-ki Cho, Seoul (KR); Heui-keun Choh, Seongnam-si (KR); YouSun Bang, Seoul (KR); Se-eun Kim, Suwon-si (KR); Yun-tae Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 518 days.

(21) Appl. No.: 11/892,426

(22) Filed: Aug. 22, 2007

(65) Prior Publication Data
US 2008/0088892 A1    Apr. 17, 2008

(30) Foreign Application Priority Data
Oct. 12, 2006    (KR) .................. 10-2006-0099520

(51) Int. Cl.
*H04N 1/46*    (2006.01)
*G06K 1/00*    (2006.01)

(52) U.S. Cl.
USPC ........... 358/504; 358/518; 358/522; 358/525; 358/1.9; 358/516; 382/162; 345/604

(58) Field of Classification Search
USPC ........... 358/504, 518, 522, 525, 516; 382/162
See application file for complete search history.

(56) References Cited

U.S. PATENT DOCUMENTS

| | | | |
|---|---|---|---|
| 5,696,611 A | 12/1997 | Nishimura et al. | |
| 6,198,552 B1 | 3/2001 | Nagae | |
| 6,788,812 B1 * | 9/2004 | Wilkins | 382/167 |
| 6,961,066 B2 | 11/2005 | James | |
| 7,126,718 B1 * | 10/2006 | Newman et al. | 358/1.9 |
| 2003/0020727 A1 * | 1/2003 | Newman | 345/604 |
| 2004/0160615 A1 * | 8/2004 | Rumph et al. | 358/1.9 |
| 2005/0185837 A1 * | 8/2005 | Takano et al. | 382/162 |
| 2008/0080784 A1 * | 4/2008 | Ozdemir | 382/274 |

FOREIGN PATENT DOCUMENTS

| | | |
|---|---|---|
| EP | 1 085 749 | 3/2001 |
| JP | 10-108031 | 4/1998 |
| JP | 11-175048 | 7/1999 |
| JP | 2001-211341 | 8/2001 |
| JP | 2001-326826 | 11/2001 |

(Continued)

OTHER PUBLICATIONS

Japanese Office Action dated Jan. 24, 2012 issued in corresponding Japanese Patent Application No. 2007-266579.

(Continued)

*Primary Examiner* — Quang N Vo
(74) *Attorney, Agent, or Firm* — Staas & Halsey LLP

(57) ABSTRACT

A system, medium, and method calibrating gray data. The system calibrating gray data includes a transformation unit to transform red, green, and blue (RGB) data of a source device into transformed color data of a different color space using a color appearance model, and a calibration unit to map a chroma value of gray data, corresponding to the transformed color data, in the different color space to a predetermined value to generate calibrated color space data.

27 Claims, 9 Drawing Sheets

(56) References Cited

FOREIGN PATENT DOCUMENTS

| | | |
|---|---|---|
| JP | 2001-326829 | 11/2001 |
| JP | 2004-320190 | 11/2004 |
| JP | 2006-173825 | 6/2006 |
| JP | 2006-217181 | 8/2006 |
| JP | 2006-237657 | 9/2006 |
| KR | 1020000007751 | 2/2000 |
| KR | 100343204 | 6/2002 |
| WO | 97/00495 | 1/1997 |
| WO | 2005/002205 A1 | 1/2005 |

OTHER PUBLICATIONS

European Extended Search Report mailed Dec. 27, 2010 corresponds to European Patent Application No. 07117883.4-2202.

"The CIECAM02 Color Appearance Model, IS&T/SID 10$^{th}$ Color Imaging Conference", Nathan Moroney, Mark D. Fairchild Robert W. G. Hunt, Changjun Li, M. Ronnier Luo, and Todd Newman; pp. 23-27.

"IEC TC-100, IEC 61966-2-1, Color Management Default RGB Color Space sRGB"; Oct. 1999.

* cited by examiner

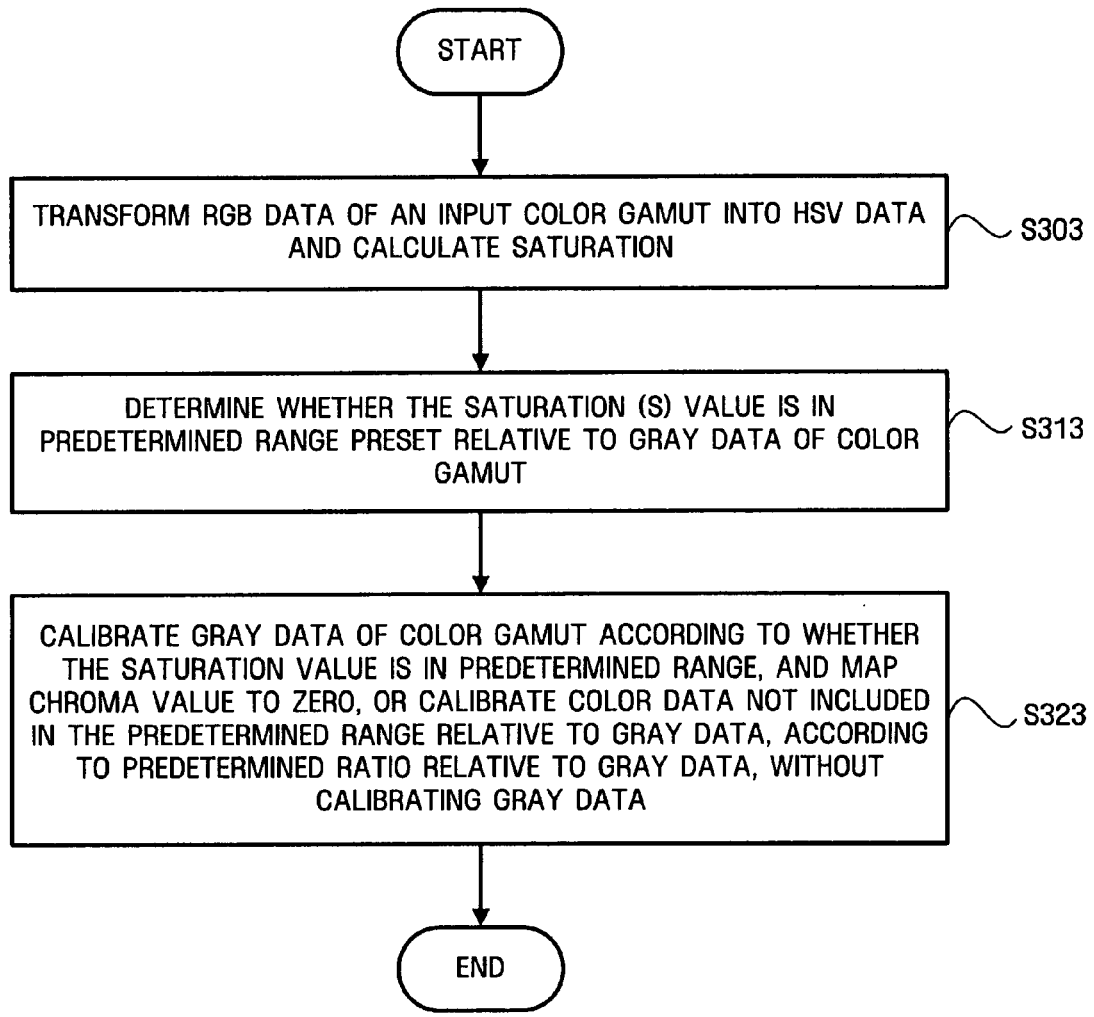

FIG. 8

| R | G | B | CIELab, OBSERVATION LIGHT SOURCE: D65 | | CIECAM02, OBSERVATION LIGHT SOURCE: D65 | | CIECAM02, OBSERVATION LIGHT SOURCE: D50 | |
|---|---|---|---|---|---|---|---|---|
| | | | L | C | J | C | J | C |
| 0 | 0 | 0 | 0.00 | 0.00 | 0.00 | 0.00 | 0.00 | 0.00 |
| 32 | 32 | 32 | 12.24 | 0.00 | 9.65 | 0.85 | 9.62 | 7.06 |
| 64 | 64 | 64 | 27.09 | 0.00 | 19.50 | 1.23 | 19.44 | 10.21 |
| 96 | 96 | 96 | 40.73 | 0.00 | 30.78 | 1.56 | 30.69 | 12.90 |
| 128 | 128 | 128 | 53.59 | 0.00 | 43.16 | 1.85 | 43.05 | 15.30 |
| 160 | 160 | 160 | 65.86 | 0.00 | 56.44 | 2.12 | 56.29 | 17.50 |
| 192 | 192 | 192 | 77.70 | 0.00 | 70.49 | 2.37 | 70.30 | 19.54 |
| 224 | 224 | 224 | 89.17 | 0.00 | 85.20 | 2.60 | 84.97 | 21.45 |
| 255 | 255 | 255 | 100.00 | 0.00 | 100.00 | 2.81 | 99.73 | 23.20 |

810 → CIELab, OBSERVATION LIGHT SOURCE: D65 — 802
820 → CIECAM02, OBSERVATION LIGHT SOURCE: D65 — 804
830 → CIECAM02, OBSERVATION LIGHT SOURCE: D50 — 806

SYSTEM, MEDIUM, AND METHOD CALIBRATING GRAY DATA

CROSS-REFERENCE TO RELATED APPLICATIONS

This application claims priority from Korean Patent Application No. 10-2006-0099520 filed on Oct. 12, 2006 in the Korean Intellectual Property Office, the disclosure of which is incorporated herein by reference in its entirety.

BACKGROUND OF THE INVENTION

1. Field of the Invention

One or more embodiments of the present invention relate to a system, medium, and method calibrating gray data, and more particularly, to a system, medium, and method calibrating gray data in which gray data included in the color gamut of a source device is calibrated, thereby removing a color tone that can appear when the gray data is reproduced in a reproduction device, for more consistent high quality color between devices.

2. Description of the Related Art

Color calibration has been referred to as a process of adjusting an output visual characteristic of a display to fit a reference color of another device, and is widely used in order to accurately represent colors for printing. Since video monitors use a red, green, and blue (RGB) rendering method to display different colors, in order to print an image using cyan, magenta, yellow, and black (CMYK) ink, through a CMYK rendering method, color calibration of the image is performed. For color calibration, color lookup table values are conventionally used.

Meanwhile, color input and output devices reproducing colors, such as a monitor, a scanner, a camera, or a printer, use different color spaces or color models according to their application field. For example, in the case of a color image, printing devices use a CMY or CMYK color space, and color cathode ray tube (CRT) monitors or computer graphic devices use an RGB color space. Devices required to separately process color, saturation and brightness use a hue, saturation, and intensity (HIS) color space. Further, in order to define device-independent colors, that is, colors that can be accurately reproduced by any device, a Commission Internationale de L'Eclairage (CIE) color space has also been used, and leading examples of the CIE color space include CIEXYZ, CIELab, and CIELuv color spaces. In addition to these color spaces, the range of colors that can be represented, that is, color gamuts, may be different between color input and output devices. Due to the difference between these color gamuts, when an identical image is observed through different input and output devices, the observed images may be observed to have different colors.

The CIELab color model is based on the color model that the Commission Internationale de L'Eclairage (CIE) originally suggested as an international standard for measuring colors. Here, the CIELab color space is device-independent. That is, irrespective of device, such as a monitor, printer, or computer, which is used to generate or output an image, constant observable color can be generated across the devices. A CIELab color is formed with a lightness (L) component and two color tones a and b. The color tone component a is positioned between green and red, and the component b is positioned between blue and yellow.

Meanwhile, starting from Windows Vista color space, color spaces supported by Microsoft include a CIELab color space, and a CIECAM02 color space, which is used in color matching. The CIECAM02 color space, which is an extended version of the CIELab color space system, is capable of accurately modeling the human visual characteristic with observation environments reflected thereon. More specifically, in a conventional color management system (CMS) of an operating system (OS), an observation light has been fixed to the known D50 when color matching between a display and a printer is performed. However, in Windows Vista, the CIECAM02 color space is supported, thereby allowing comparison and observation of images under a variety of illumination conditions, including the known D65, F, and A light sources, as well as the D50 light source.

However, as an example, when the CIECAM02 color space is used and gray data of a source device is reproduced in a reproducing device, a color tone may appear.

FIG. 1 illustrates a conventional method of calibrating gray data.

This conventional method of calibrating gray data depends mostly on the human visual characteristic and user interaction. As illustrated in FIG. 1, first, a gray test patch 12 with a predetermined lightness level is displayed on the screen. Then, based upon user interaction it can be determined whether a color tone is seen in the displayed test patch 12, a gray balance guide map 14 on the bottom left hand corner of the screen and a gray balance cursor 16 can be adjusted, thereby removing an observed color tone. For example, if a red tone is seen in the test patch 12, the gray balance cursor 16 is moved in the red direction of the gray balance guide map 14, thereby removing the red color tone in the test patch 12.

However, since this method depends on the human visual characteristic and human interaction, calibration results may differ depending on each individual evaluator's subjectivity, which may often be inconsistent and inaccurate.

SUMMARY OF THE INVENTION

One or more embodiments of the present invention provide a method, medium, and system calibrating gray data, in which gray data included in a color gamut of a source device is calibrated, thereby removing a color tone that can appear when the gray data is reproduced in a reproduction device, for more consistent high quality colors between devices.

Additional aspects and/or advantages of the invention will be set forth in part in the description which follows and, in part, will be apparent from the description, or may be learned by practice of the invention.

To achieve the above and/or other aspects and advantages, embodiments of the present invention include a system calibrating gray data, including a transformation unit to transform red, green, and blue (RGB) data of a source device into transformed color data of a different color space using a color appearance model, and a calibration unit to map a chroma value of gray data, corresponding to the transformed color data, in the different color space to a predetermined value to generate calibrated color space data.

To achieve the above and/or other aspects and advantages, embodiments of the present invention include a method of calibrating gray data, including transforming red, green, and blue (RGB) data into transformed color data of a different color space, and generating and outputting calibrated color space data by mapping a chroma value of gray data, corresponding to the transformed color data, in the different color space to a predetermined number.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3B illustrates a method for calibrating gray data, according to another embodiment of the present invention;

FIG. 8 illustrates gray data of an sRGB model and LC and JC data related to the gray data, for different color spaces for color matching and different observation light sources, according to an embodiment of the present invention;

DETAILED DESCRIPTION OF THE PREFERRED EMBODIMENTS

Figure 1:
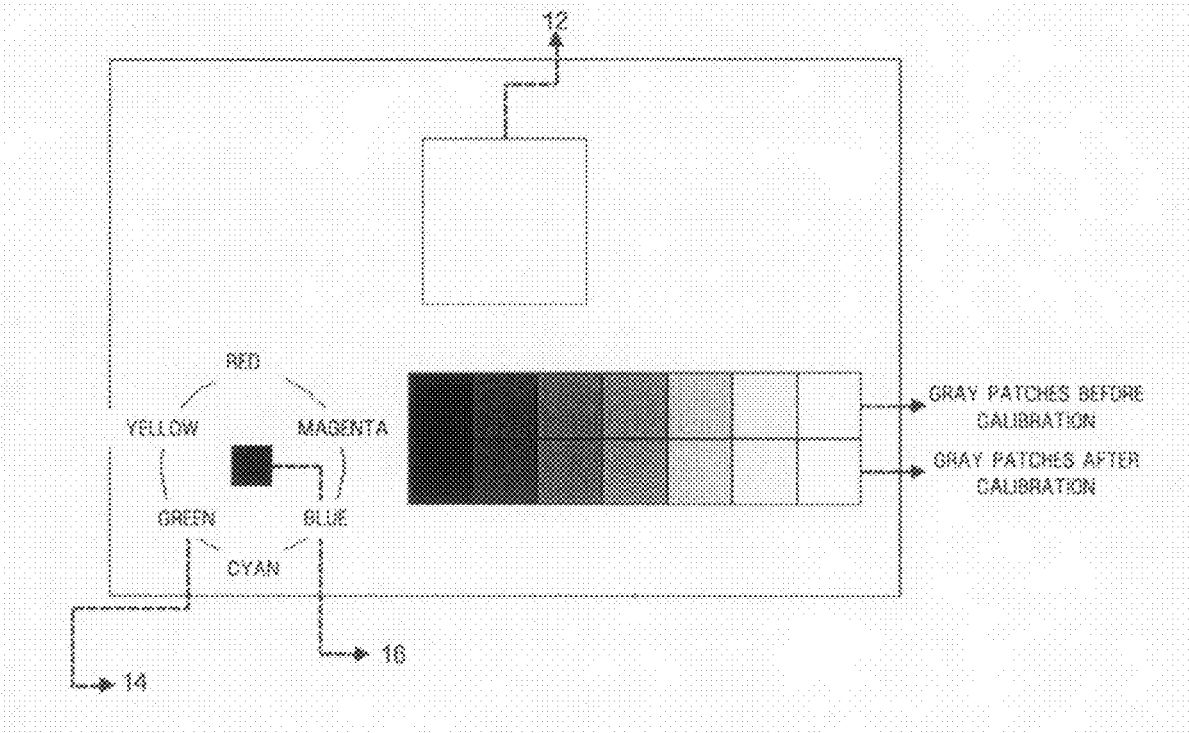
FIG. 1 illustrates a conventional method of calibrating gray data.

Reference will now be made in detail to embodiments of the present invention, examples of which are illustrated in the accompanying drawings, wherein like reference numerals refer to the like elements throughout. Embodiments are described below to explain the present invention by referring to the figures.

In embodiments of the present invention, to facilitate understanding of the invention, an example of JCh data, which is an aspect of a CIECAM02 color space, will be described. However, it should be noted that embodiments of the present invention should not limited to such an embodiment, and a variety of color data, such as CIEJab data, RGB data, YUV data, and HSV data using a color appearance model, in addition to other color data, can be used.

Figure 2:
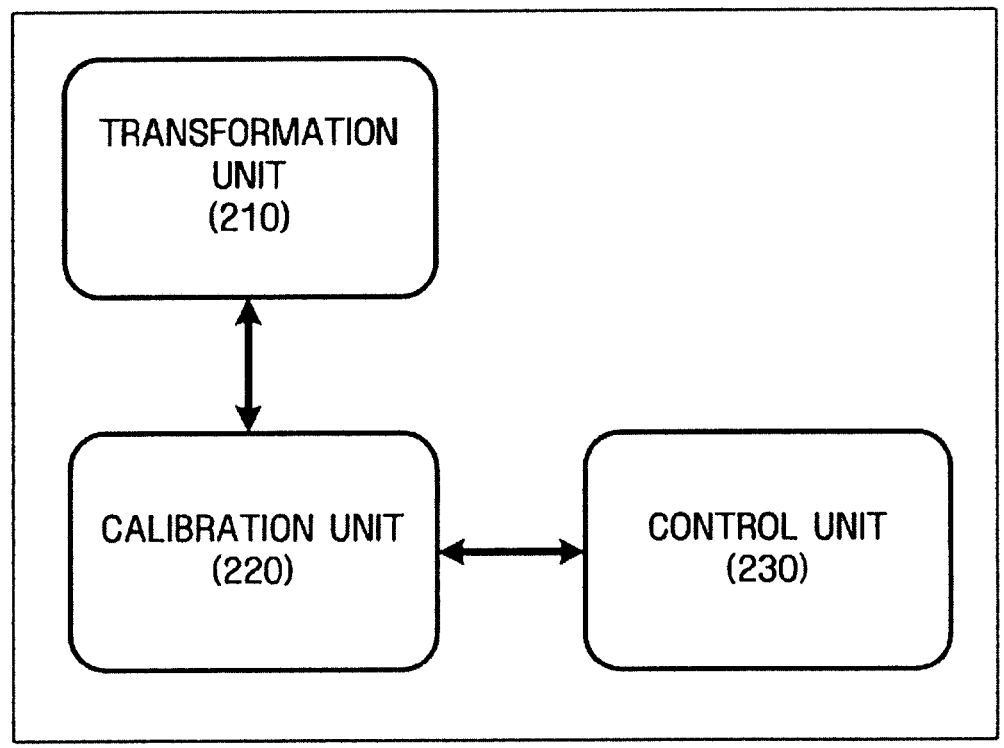
FIG. 2 illustrates a system calibrating gray data, according to an embodiment of the present invention.

FIG. 2 illustrates a system calibrating gray data, according to an embodiment of the present invention. The gray data calibrating system 200 may include a transformation unit 210, a calibration unit 220, and a control unit 230, for example. The system 200 may be a first device that provides calibrated gray data to a second device for display or printing, for example, the second device having received the gray data from the first device and performing the calibrating of the gray data before outputting the calibrated data, or the system 200 may even be a device between such devices.

The transformation unit 210 may transform RGB data input to a source device into JCh data. To achieve this, in this embodiment, the transformation unit 210 transforms the RGB data to XYZ data, and then, transforms the XYZ data to JCh data. In the JCh data, J is defined as lightness, C is defined as chroma and h is defined as hue. According to embodiments of the present invention, the RGB data can be transformed to JCh data through methods illustrated in FIGS. 4 through 7, which will be explained further below. In addition, in the embodiments of the present invention, J and C components excluding the hue component may be used. To see a specific calculation process for a transforming of data, "IEC TC-100, IEC 61966-2-1, Color Management Default RGB Color Space sRGB (1999)," can be referred to.

The calibration unit 220 may calibrate gray data of the color gamut (on the boundary of or inside the gamut) in a color space having the transformed JCh data as a component, thereby mapping the chroma value towards 0, and preferably 0. Here, "gray data" preferably means color data in which the values of the R, G, and B components are identical, and includes a wide variation, such as dark gray, and light gray. The gray data may exist on a gray axis of a color gamut, and if the chroma value is not zero, a color tone may appear.

Accordingly, the calibration unit 220 may map the chroma value of the gray data toward 0 in order to remove the color tone. In the mapping process, color data in the color gamut may also move (transform) together according to the mapping distance of the gray data. The mapping distance means the degree of transformation needed to transform an original chroma value into a chroma value so that the chroma value of the gray data is mapped toward 0.

Here, the calibration unit 220 can map the chroma value of the gray data toward or to 0 while maintaining the brightness of black and white. In addition, color data having a brightness level identical to that of the predetermined gray data may be moved according to the mapping distance of the gray data while maintaining the brightness value of the color data. Further details of this transformation will be explained below with reference to FIG. 10.

In another embodiment, the calibration unit 220 may also decrease a color tone appearing in color data rather than the gray data. To achieve this, in an embodiment, the transformation unit 210 may transform the RGB data into HSV data, and calculate saturation (S). Then, the calibration unit 220 may calibrate the gray data in the color gamut to then map the chroma value thereof toward or to 0, or may calibrate color data not included in a predetermined range relative to the gray data in a predetermined ratio, without calibrating the gray data, according to a determination result made by the control unit 230, which will be explained in greater detail further below, e.g., with reference to FIG. 11.

The control unit 230 may determine whether the saturation value (S), e.g., calculated through the transformation unit 210, is included in a predetermined set range relative to the gray data of the color. According to the determination result, the calibration unit 220 may calibrate the gray data of the color gamut, thereby mapping the chroma value toward or to 0, or calibrate the color data not included in a predetermined range without calibrating the gray data. In this way, the control unit 230 can be used effectively for decreasing a color tone that can appear in color data other than gray data, and may also be omitted in differing embodiments.

Figure 3A:
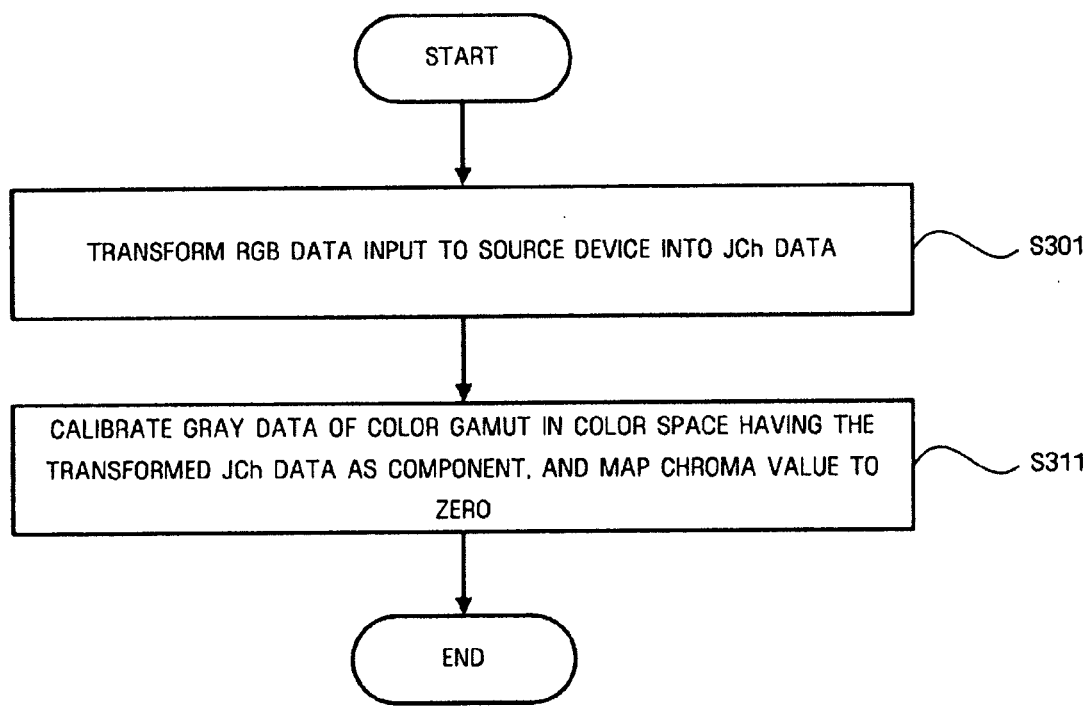
FIG. 3A illustrates a method for calibrating gray data, according to an embodiment of the present invention.

FIG. 3A illustrates a method for calibrating gray data, according to an embodiment of the present invention.

RGB data input to a source device may be transformed into JCh data, in operation S301, e.g., by the transformation unit 210.

Gray data of a color gamut in a color space having the transformed JCh data may be calibrated, e.g., by the calibration unit 220, thereby mapping the chroma value of the gray data toward or to 0, in operation S311.

FIG. 3B illustrates a method for calibrating gray data, according to another embodiment of the present invention.

According to this embodiment, a color tone that can appear in color data other than gray data can be decreased.

To achieve this, the RGB data of a color gamut may be transformed into HSV data and a saturation (S) may be calculated, in operation S303, e.g., the transformation unit 210.

It may further be determined whether the saturation value (S) is within a predetermined range, e.g., preset relative to gray data of the color gamut, in operation S313, e.g., by the control unit 230.

In one embodiment, the calibration unit 220 calibrates the gray data of the color gamut according to whether the saturation value (S) is within the predetermined range, thereby mapping the chroma value to 0, or calibrates, in a predetermined ratio, the color data not within the predetermined range in a predetermined ratio relative to the gray data without calibrating the gray data, in operation S323. That is, in this embodiment, if the saturation value (S) is within the preset range, the calibration unit 220 calibrates the gray data, thereby mapping the chroma value to 0, and if the saturation value (S) is not within the preset range, the calibration unit 220 calibrates the color data not included in the predetermined range in a predetermined ratio, without calibrating the gray data.

A method for calibrating gray data of a color gamut and mapping the chroma value toward or to 0, according to an embodiment of the present invention, will now be explained in more detail. First, a process of transforming RGB data into JCh data will be explained with reference to FIGS. 4 through 7. Then, a color tone phenomenon appearing in gray data will be introduced using experimental data with reference to FIGS. 8 and 9. In addition, examples of a method for calibrating gray data of a color gamut in the CIECAM02 color space, according to an embodiment, thereby removing a color tone, will be explained with reference to FIGS. 10 and 11.

Figure 4:
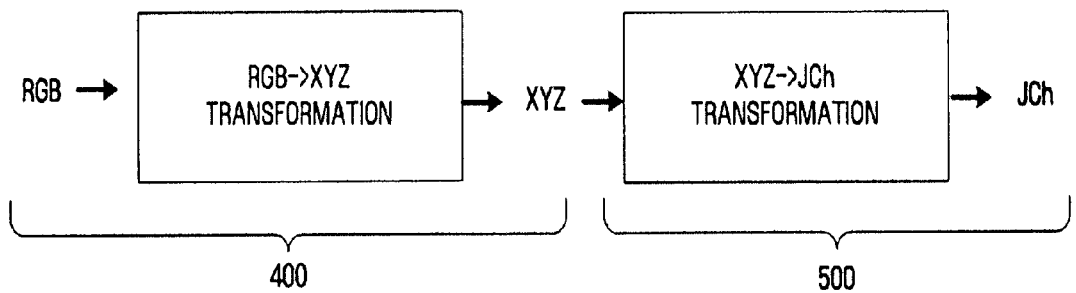
FIGS. 4 through 7 are conceptual diagrams illustrating a process of transforming RGB data to JCh data, according to an embodiment of the present invention.

FIG. 4 illustrates a process of transforming RGB data into JCh data, according to an embodiment of the present invention.

In the process conceptually illustrated in FIG. 4, RGB data is transformed to JCh data, which are components of the CIECAM02 color space.

Figure 5:
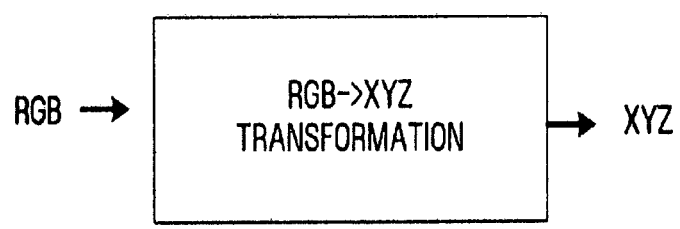
Figure 6:
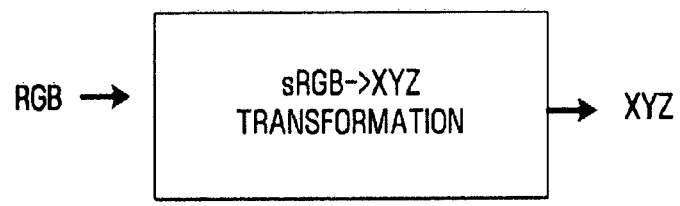

The method of transforming RGB data into XYZ data, illustrated as operation 400, can be performed in a variety of conventional ways, for example. Thus, as illustrated in FIG. 5, XYZ data of RGB patches of a source device can be obtained by using a color measuring device, and thus the RGB data can be transformed to XYZ data. In addition, as an example of another method, as illustrated in FIG. 6, RGB data can be transformed to XYZ data, which is a component of a CIEXYZ color space, by using an sRGB model.

Figure 7:
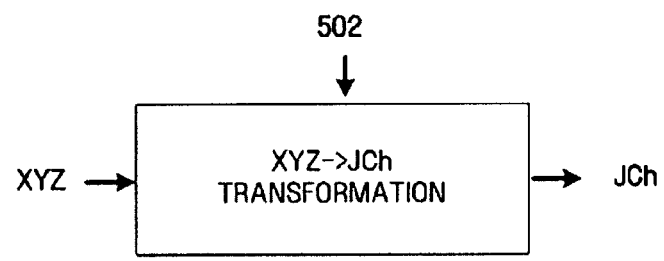

In a next stage, a method of transforming the transformed XYZ data into JCh data, illustrated as operation 500 in FIG. 4 and shown in FIG. 7, may use a plurality of observation environment parameters 502. The observation environment parameters 502 include a white component of a CIEXYZ color space, a predetermined white component under predetermined conditions, a background brightness component, etc. For more detail, an article by Nathan Moroney, Mark Fairchild, Robert Hunt, Changjun Li, Ronnier Luo and Todd Newman, "The CIECAM02 Color Appearance Model, IS&T/SID 10th Color Imaging Conference" can be referred to.

FIG. 8 illustrates a table of gray data of an sRGB model and LC and JC data related to the gray data, for different color spaces for color matching and different observation light sources, according to an embodiment of the present invention.

For example, gray data of an sRGB model and LC and JC data related to the gray data is shown for different color spaces for color matching CIELab and CIECAM02 color spaces and different observation light sources D50 and D65 in table categories 810 and 820, respectively.

As illustrated in FIG. 8, when the color space for color matching is CIELab in table category 810, the chroma value of gray data is 0.00, as shown in corresponding table portion 802, and when the color space for color matching is CIECAM02, as shown in table categories 820 and 830, the chroma value of gray data is not 0.00, as shown in corresponding respective table portions 804 and 806. Accordingly, in the case of a color space of CIECAM02 table categories 820 and 830, when color is reproduced in a reproduction device, an observable color tone may occur in gray data. Data shown in the table of FIG. 8 will be explained in more detail with reference to the graph of FIG. 9.

Figure 9:
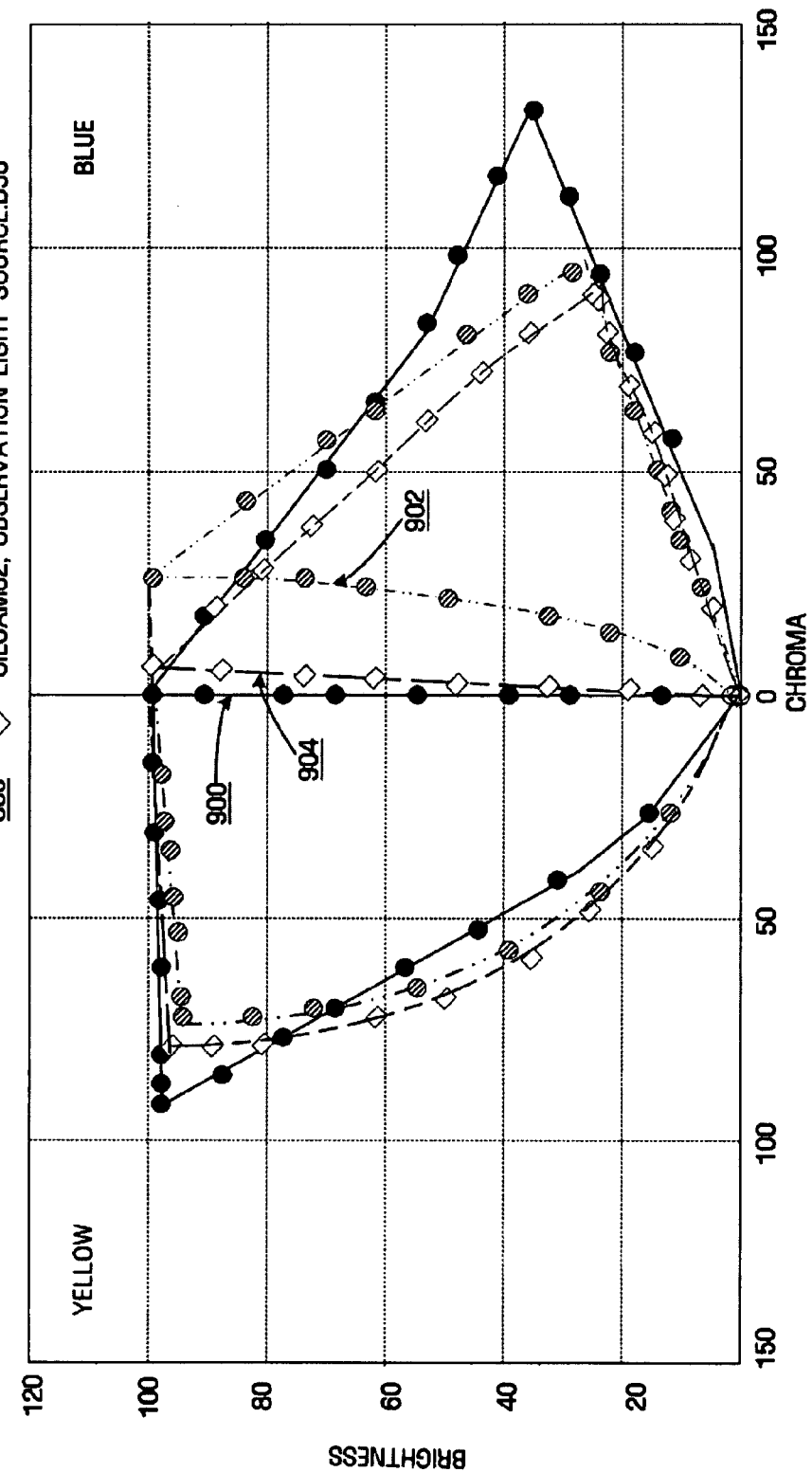
FIG. 9 illustrates comparison results of gray axes and color gamuts of yellow and blue of sRGB models in color spaces used in color matching, e.g., CIELab and CIECAM02, with observation light sources D50 and D65, according to an embodiment of the present invention.

Accordingly, FIG. 9 graphically illustrates comparison results of gray axes and color gamuts of yellow and blue of sRGB models in color spaces used in color matching, e.g., CIELab and CIECAM02 color spaces with observation light sources D50 and D65, according to an embodiment of the present invention.

In relation to FIG. 8, it can be seen that when the color space for color matching is the CIELab color space corresponding to table portion 810 of FIG. 8, gray data exists on the gray axis 900 of FIG. 9 in which the chroma value of the gray axis 900 in the CIELab color space corresponding to table portion 810 is 0. However, from FIG. 9, it can be seen that when the color space for color matching is the CIECAM02 color spaces corresponding to table portions 820 and 830 of FIG. 8, gray data exists on gray axes 902 and 904 in which the chroma value is not 0.

Figure 10:
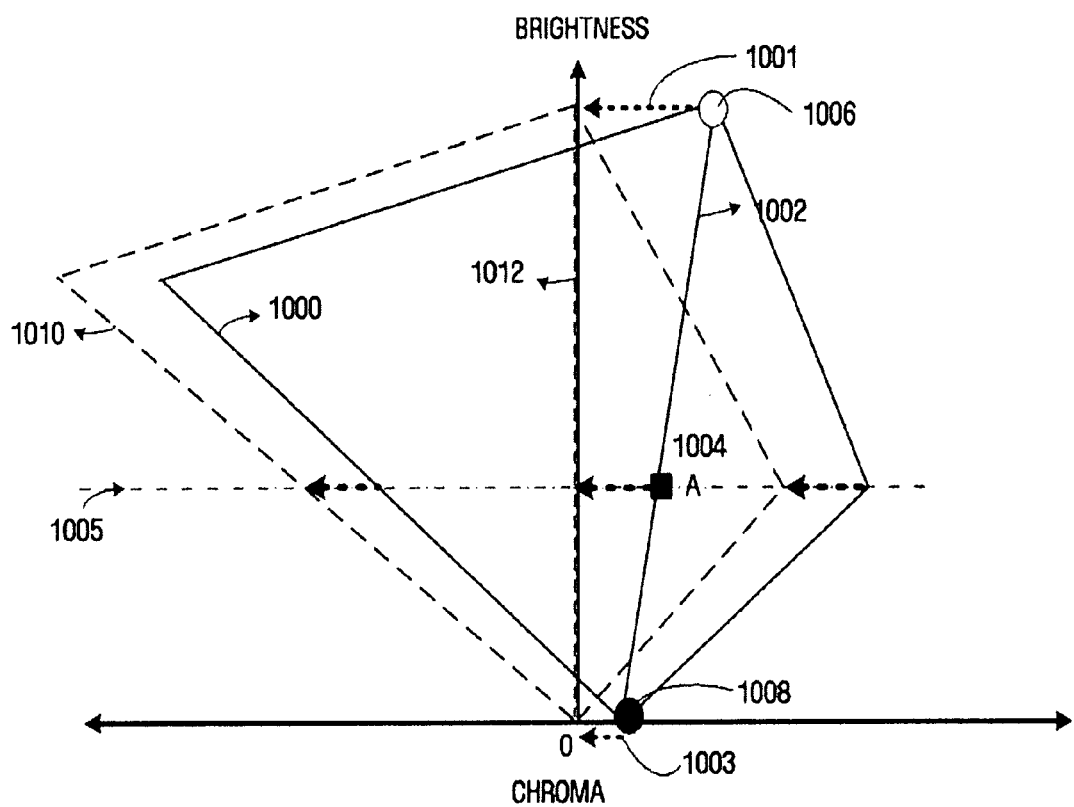
FIG. 10 illustrates a method of calibrating gray data, according to an embodiment of the present invention.
Figure 11:
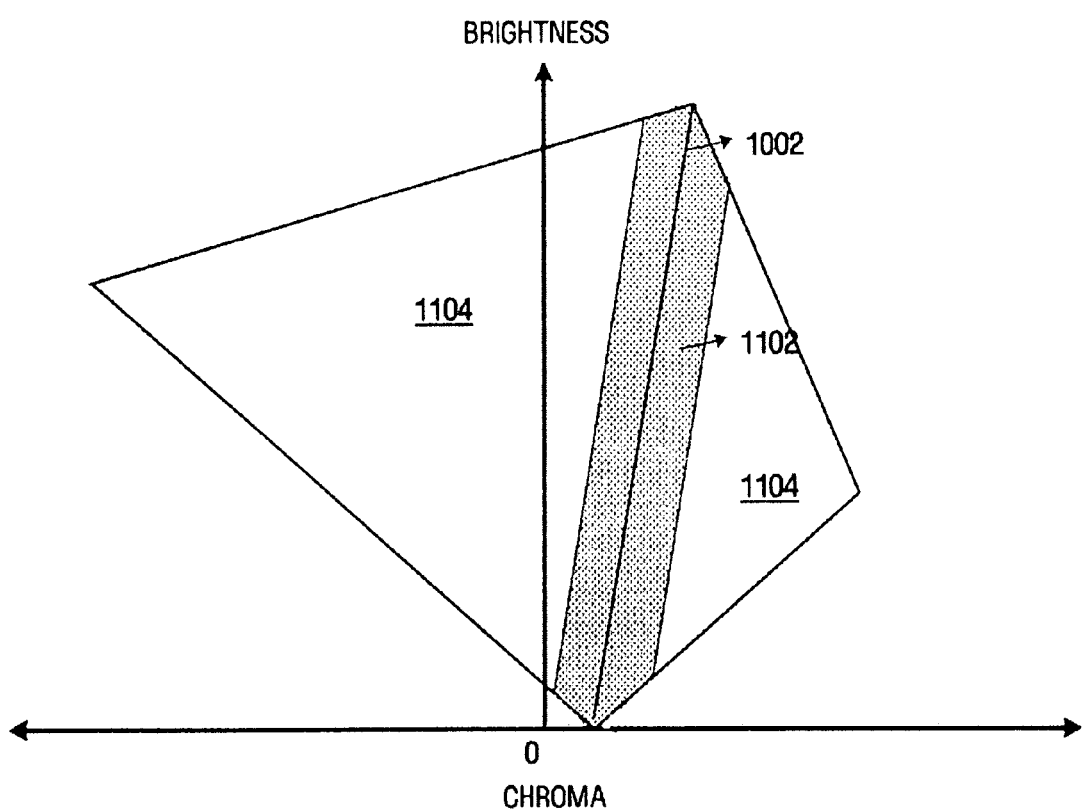
FIG. 11 illustrates a method of calibrating gray data, according to another embodiment of the present invention.

When the color space for color matching is the CIECAM02 color space, since a color tone may occur in the gray data, the chroma value of the gray data may be mapped toward or to 0 through a process illustrated in FIG. 10 or 11, for example, thereby removing the color tone.

FIG. 10 illustrates a method for calibrating gray data, according to an embodiment of the present invention.

In FIG. 10, illustrated are an original color gamut boundary 1000 and a color gamut boundary after calibration 1010. In order to calibrate gray data, the calibration unit 220, for example, may map the chroma value of the gray data on the gray axis 1001 of the original color gamut, thereby moving (transforming) the gray axis 1001 to the gray axis 1012 in which the chroma value is 0, while maintaining the brightness of black and white. Here, in order to map the chroma value of the original gray data to 0, the original axis is moved a predetermined distance according to the below Equation 1, and color data of the original color gamut also moves the mapping distance, for example.

$$\text{offset} = \frac{\{(\text{given\_J} - \text{black\_J}) \times \text{white\_dist}\} + \{(\text{white\_J} - \text{giben\_J}) \times \text{black\_dist}\}}{(\text{white } J - \text{black } J)} \quad \text{Equation 1}$$

Here, given_J is the brightness value of the original color data, black_J and white_J are the brightness values of black 1008 and white 1006, respectively, and white_dist and black_dist are moving distances of white 1001 and black 1003, respectively. Here, the brightness values of white 1006 and black 1008 may be maintained to be identical before and after calibration of gray data.

Accordingly, through Equation 1, a mapping distance (offset), which is the distance that the chroma value of the gray data on the original gray axis needs to be moved to map it to 0, that is, the degree of transformation of the chroma value, can be obtained.

Next, the difference between the color value (given_C) of the original color data and the resultant value (offset) of Equation 1, that is, the mapping distance (offset) that the chroma value of the gray data on the original gray axis needs to be moved to map it to 0, is obtained. This difference is the color value (new_C) of the color data after calibration. This may be expressed by the below Equation 2, for example.

Equation 2:

$$new\_C = given\_C - offset$$

Here, given_C is the chroma value of the original color data, offset is the mapping distance as the resultant value of Equation 1, and new_C is the chroma value of the color data after calibration. Accordingly, with this embodiment, through Equations 1 and 2, the chroma value of the gray data can be calibrated to 0, thereby removing the color tone of the gray data.

For example, again with reference to FIG. 10, in relation to data labeled as 'A' 1004 (hereinafter 'A data 1004'), which is gray data of the original gray axis, the calibration unit 220 moves the A data 1004 a predetermined distance in order to map the chroma value to 0 by using Equation 1. Then, all original color data having a brightness value at the same level as the brightness value of the A data 1004 may also be moved the same distance (offset) as the A data 1004. In this way, the color data on the boundary 1000 of or inside the original color gamut may also be moved the same distance (offset) as the A data 1004. Through this process, the chroma value of the gray data on the original gray axis may be calibrated to 0, for example.

In addition to the method illustrated in FIG. 10, gray data may also be calibrated through the method illustrated in FIG. 11.

Accordingly, FIG. 11 illustrates a method of calibrating gray data, according to another embodiment of the present invention.

Here, a color tone may also occur in color data rather than gray data, and a method of reducing this color tone is thus illustrated in FIG. 11 as another example of a method for calibrating gray data.

As in FIG. 10, in order to calibrate gray data, the chroma value of gray data on the original gray axis may be mapped to 0, while maintaining the brightness values of black and white. Here, the transformation unit 210, for example, may transform RGB data of the color data of the original color gamut to HSV data, and calculate saturation (S) according to the below Equation 3. HSV is a color model expressing colors using a hue, saturation and brightness (value). The hue is typically measured based on a position on a standard color circle and expressed by an angle from 0 to 360 degrees. Usually, the hue is distinguished as colors, such as red, orange, and green. Saturation is also referred to as chroma, and indicates the intensity or purity of a color. Saturation indicates the amount of gray in ratio to a color tone, and is measured as a percentage between 0% (gray) and 100% (complete color). In the standard color circle, the saturation increases with increasing distance from the center of the circle and with decreasing distance from the circumference. Meanwhile, the brightness (value) indicates relative brightness or darkness of a color, and is expressed as a percentage between 0% (black) and 100% (white).

According to an embodiment, the saturation (S) may be obtained according to the below Equation 3, for example.

Equation 3:

$$V = MAX(R, G, B)$$
$$IF(V = 0) \quad S = 0$$
$$ELSE \quad S = \{V - MIN(R, G, B)\}/V$$

In Equation 3, V can have a value from 0 (black) to 255 (white), and S (saturation) can have a value from 0 (achromatic color) to 255 (pure color), for example.

More specifically in the process of Equation 3, first, data having a maximum value among RGB data in relation to JCh data of the original color gamut may be substituted for V. If the value of V is 0, e.g., if V is black, S is set to 0, or else, the difference between a maximum V value and data items having a minimum value among RGB data is obtained, and the obtained value is divided by the V value, and then, the resultant value is substituted for S. Through this process, the saturation (S) can be calculated from the RGB data.

Next, with regard to FIG. 11, the calibration unit 220, again as an example, may calibrate the original gray data using Equations 1 and 2, in relation to an S value in a range 1102 set relative to the original gray data. In relation to an S value not included in the preset range 1102, the calibration unit 220 does not calibrate the original gray data, and calibrates the color data 1104 not included in the preset range 1102, in a predetermined ratio.

The predetermined ratio can be expressed by the below Equation 4, for example.

$$ratio = 1 - \frac{S^3}{S^3 + 20000} \qquad \text{Eqution 4}$$

In Equation 4, if S is 0, the ratio is 1, and with the increasing S value, the ratio converges on 0, thereby showing a form similar to that of a Gaussian function.

By using the ratio express of Equation 1 and Equation 4 and the below Equation 5, for example, the gray data on the original gray axis 1002 shown in FIG. 11 or the color data 1104 not included in the preset range 1102 may be calibrated.

Equation 5:

$$new\_C = given\_C - offset \times ratio$$

Here, in view of the above Equation 4, if S is 0, that is, if the color is achromatic, the ratio is close to 1, and therefore, the original gray data may be calibrated using Equation 5. In addition, as the S value increases, that is, the higher the purity of a color is, the closer the ratio becomes to 0. Accordingly, the color data 1104 not included in the preset range 1102 may be calibrated without performing calibration of the original gray data.

As a result, the color tone may be caused to occur in color data rather than the gray data.

Each element describe above, such as illustrated in FIG. 2, may be implemented as a kind of 'module'. The term 'module', as used herein, means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they are executed one or more computers in a communication system.

With this in mind, and in addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs) for example. The media may also be a distributed network, so that the computer readable code is stored/transferred and executed in a distributed fashion. Still further, as only an example, the processing element could include a processor or a computer processor, and processing elements may be distributed and/or included in a single device.

According to a system, medium, and method calibrating gray data of one or more embodiments of the present invention, gray data included in a color gamut can be calibrated, thereby removing a color tone that can appear when the gray data generated by a first device is reproduced by a second device, thereby providing greater consistent high quality color data unaffected by subjective user determinations.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A system including at least one processing device calibrating gray data, the system comprising:
a transformation unit to transform red, green, and blue (RGB) data of a source device into transformed color data of a different color space using a color appearance model; and
a calibration unit to adjust a chroma value of the gray data in the transformed color data, transformed into the different color space by the transformation unit transforming the gray data into the transformed color data, to a predetermined value to generate calibrated color space data of the gray data with removal of a color tone from the gray data, by moving the chroma value of the gray data by a mapping distance,
wherein the adjusting the chroma value of the gray data includes moving each chroma value of the transformed color data with a respective brightness value, among brightness values, the same mapping distance, thereby maintaining the respective brightness value, such that when plural chroma values correspond to the respective brightness value, each of the plural chroma values is moved by the same mapping distance, resulting in the calibrated color space data of the gray data.

2. The system of claim 1, wherein the transformation unit transforms the RGB data into a color space having components of hue, saturation, and value (HSV) data and calculates a corresponding saturation value.

3. The system of claim 2, further comprising:
a control unit to determine whether the saturation value is within a predetermined range preset relative to gray data.

4. The system of claim 3, wherein, if the saturation value is determined by the control unit to not be within the predetermined range, the calibration unit does not calibrate the gray data and calibrates color data, corresponding to the transformed color data, according to a predetermined ratio.

5. The system of claim 1, wherein the transformed color data is JCh data.

6. The system of claim 1, wherein the different color space is a CIECAM02 color space.

7. The system of claim 1, wherein, in relation to color data, of the transformed color data, having a brightness level identical to that of the gray data, the calibration unit maintains the brightness value and maps the chroma value of the gray data to 0.

8. The system of claim 1, wherein the calibration unit maps the chroma value of black and white data to 0, while maintaining brightness values of the black and white data of the transformed color data in generating the calibrated color space data.

9. The system of claim 1, wherein, by using at least any one of respective brightness values of black and white data of the transformed color data, a brightness value of the gray data, and respective chroma values of the black and white data, the calibration unit obtains a corresponding chroma value that is to be changed in order to map the chroma value of the gray data to 0.

10. The system of claim 1, wherein the system is one of a first device and a second device, wherein the first device reproduces the input data without transformation and the second device reproduces the calibrated color space data.

11. The system of claim 1, wherein the calibrated color space data of the gray data results when the chroma values of the transformed color data have moved the respective mapping distances.

12. A system including at least one processing device calibrating gray data, the system comprising:
a transformation unit to transform red, green, and blue (RGB) data of a source device into transformed color data of a different color space using a color appearance model, wherein the transformation unit transforms the RGB data into a color space having components of hue, saturation, and value (HSV) data and calculates a corresponding saturation value;
a calibration unit to adjust a chroma value of gray data in the transformed color data, transformed into the different color space by the transformation unit transforming the gray data into the transformed color data, to a predetermined value to generate calibrated color space data of the gray data with removal of a color tone from the gray data, by moving the chroma value by a mapping distance; and
a control unit to determine whether the saturation value is within a predetermined range preset relative to gray data,
wherein, if the saturation value is determined by the control unit to be within the predetermined range, the calibration unit maps the chroma value of the gray data to 0 for the removal of the color tone from the gray data,
wherein the adjusting the chroma value of the gray data includes moving each chroma value of the transformed color data with a respective brightness value, among brightness values, the same mapping distance, thereby maintaining the respective brightness value, such that when plural chroma values correspond to the respective brightness value, each of the plural chroma values is moved by the same mapping distance, resulting in the calibrated color space data of the gray data.

13. A system including at least one processing device calibrating gray data, the system comprising:
a transformation unit to transform red, green, and blue (RGB) data of a source device into transformed color data of a different color space using a color appearance model;
a calibration unit to map a chroma value of the transformed color data, transformed into the different color space by the transformation unit transforming gray data into the transformed color data, to a predetermined value to generate calibrated color space data of the gray data with removal of a color tone from the gray data, by moving the chroma value by a mapping distance,
wherein the transformed color data other than the chroma value move the mapping distance, and maintain brightness values,
wherein the transformation unit transforms the RGB data into a color space having components of hue, saturation, and value (HSV) data and calculates a corresponding saturation value, and
a control unit to determine whether the saturation value is within a predetermined range preset relative to gray data,
wherein, if the saturation value is determined by the control unit to not be within the predetermined range, the calibration unit does not calibrate the gray data and calibrates color data, corresponding to the transformed color data, according to a predetermined ratio,
wherein the predetermined ratio is based on:

$$\text{ratio} = 1 - \frac{S^3}{S^3 + 20000},$$

wherein S is the saturation value, and ratio is a ratio for calibration.

14. A system including at least one processing device calibrating gray data, the system comprising:
a transformation unit to transform red, green, and blue (RGB) data of a source device into transformed color data of a different color space using a color appearance model; and
a calibration unit to adjust a chroma value of gray data of the transformed color data, transformed into the different color space by the transformation unit transforming the gray data into the transformed color data, to a predetermined value to generate calibrated color space data of the gray data with removal of a color tone from the gray data, by moving the chroma value by a mapping distance,
wherein the calibration unit maps a chroma value of gray data, of the transformed color data, disposed on a gray axis in a color gamut of the source device, to 0,
wherein the adjusting the chroma value of the gray data includes moving each chroma value of the transformed color data with a respective brightness value, among brightness values, the same mapping distance, thereby maintaining the respective brightness value, such that when plural chroma values correspond to the respective brightness value, each of the plural chroma values is moved by the same mapping distance, resulting in the calibrated color space data of the gray data.

15. A method of calibrating gray data, comprising:
transforming, by a processor, red, green, and blue (RGB) data of the gray data into transformed color data of a different color space; and
generating and outputting calibrated color space data by adjusting a chroma value of the gray data in the transformed color data to a predetermined value to generate the calibrated color space data of the gray data with removal of a color tone from the gray data, by moving the chroma value by a mapping distance,
wherein the adjusting the chroma value of the gray data includes moving each chroma value of the transformed color data with a respective brightness value, among brightness values, the same mapping distance, thereby maintaining the respective brightness value, such that when plural chroma values correspond to the respective brightness value, each of the plural chroma values is moved by the same mapping distance, resulting in the calibrated color space data of the gray data.

16. The method of claim 15, wherein the transforming of the RGB data comprises transforming the RGB data into a color space having components of hue, saturation, and value (HSV) data and calculating a corresponding saturation value.

17. The method of claim 15, further comprising determining whether the saturation value is within a predetermined range preset relative to gray data.

18. The method of claim 17, wherein the mapping of the chroma value of the gray data comprises mapping the chroma value of the gray data to 0 if the saturation value is determined to be within the predetermined range.

19. The method of claim 17, wherein, if the saturation value is determined to not be within the predetermined range, the generating of the calibrated color space data comprises selectively mapping the gray data by calibrating color data, corresponding to the transformed color data, according to a predetermined ratio without calibrating the gray data.

20. The method of claim 15, wherein the transformed color data is JCh data.

21. The method of claim 15, wherein the different color space is a CIECAM02 color space.

22. The method of claim 15, wherein the mapping of the chroma value of the gray data comprises mapping a chroma value of gray data, of the transformed color data, disposed on a gray axis in a color gamut of the source device, to 0.

23. The method of claim 15, wherein, in relation to color data, of the transformed color data, having a brightness level identical to that of the gray data, the mapping of the chroma value of the gray data comprises maintaining the brightness value and mapping the chroma value of the gray data to 0.

24. The method of claim 15, wherein the mapping of the chroma value of the gray data comprises mapping the chroma value to 0, while maintaining brightness values of black and white data of the transformed color data in the generating the calibrated color space data.

25. The method of claim 15, wherein, in the mapping of the chroma value of the gray data, a corresponding chroma value that is to be changed in order to map the chroma value of the gray data to 0 is obtained using at least any one of respective brightness values of black and white data of the transformed color data, a brightness value of the gray data, and respective chroma values of the black and white data.

26. At least one non-transitory computer readable medium comprising computer readable code to control at least one processing element to implement the method of claim 15.

27. A method of calibrating gray data, comprising:
transforming, by a processor, red, green, and blue (RGB) data of gray data into transformed color data of a different color space; and
generating and outputting calibrated color space data by mapping a chroma value of the transformed color data to a predetermined value to generate the calibrated color space data of the gray data with removal of a color tone from the gray data, by moving the chroma value by a mapping distance,
wherein the transformed color data other than the chroma value move the mapping distance, and maintain brightness values,
further comprising determining whether the saturation value is within a predetermined range preset relative to gray data
wherein, if the saturation value is determined to not be within the predetermined range, the generating of the calibrated color space data comprises selectively mapping the gray data by calibrating color data, corresponding to the transformed color data, according to a predetermined ratio without calibrating the gray data,
wherein the predetermined ratio is based on:

$$\text{ratio} = 1 - \frac{S^3}{S^3 + 20000},$$

wherein S is the saturation value, and ratio is a ratio for calibration.

* * * * *